WHEELSPEED INFORMATION SIGNAL PROCESSING SYSTEM

Filed June 8, 1970 3 Sheets-Sheet 1

INVENTOR,
NARINDER S. ATTRI

BY
Conrad O. Gardner
ATTORNEY

WHEELSPEED INFORMATION SIGNAL PROCESSING SYSTEM

Filed June 2, 1970 3 Sheets-Sheet 2

INVENTOR.
NARINDER S. ATTRI
BY
Conrad O. Gardner
ATTORNEY

INVENTOR.
NARINDER S. ATTRI
BY
Conrad O. Gardner
ATTORNEY

United States Patent Office 3,669,508
Patented June 13, 1972

3,669,508
WHEELSPEED INFORMATION SIGNAL PROCESSING SYSTEM
Narinder S. Attri, 11901 SE. 16th St., Renton, Wash. 98055
Filed June 8, 1970, Ser. No. 44,296
Int. Cl. B60t 8/12
U.S. Cl. 303—21 R 12 Claims

ABSTRACT OF THE DISCLOSURE

A braking system which includes means for generating signals having predefined relationships with respect to wheelspeed information signals having undesired frequency components. The error signal in an anti-skid system is effectively differentiated in a circuit which provides a positive sinusoidal signal at gear (or landing gear truck) frequency which is utilized in the wheelspeed information signal processing system to cancel an undesired gear walk generated negative sinusoidal signal component also at gear frequency which is superimposed upon the true wheelspeed information signals.

This invention relates to a method and apparatus for processing wheelspeed information signals, and, more particularly, to circuit means for generating signals for cancelling gear walk developed signals superimposed on the wheelspeed information signals to reduce gear walk of landing gear or truck oscillation impact on airplane braking performance.

Undesired flexing or oscillation of the landing gear, termed "gear walk" in the aircraft art, is a well understood phenomenon which results in uneven braking of the aircraft, undesirably longer distances to bring the aircraft to a stop, and, in cases of excessive harmonic landing gear displacement fore and aft, can result in damage or destruction of the landing gear. Various attempts to solve the problem have included the use of electronic circuits introducing delays which change the response of the braking system, as in U.S. Pat. No. 3,017,145 to G. W. Yarber, and mechanical devices utilized in the braking system for effecting delays and thus affecting the response of the braking system, as illustrated by U.S. Pat. No. 3,018,073 to A. J. Bent. The above approaches to the gear walk problem provide delays in brake pressure application after skid conditions which alter anti-skid system performance by affecting response of such systems.

As a consequence it is an object of this invention to provide for the processing of wheelspeed information signals by freeing such signals from superimposed sinusoidal gear walk signals without introducing delays and thereby adversely affecting system response and gain.

It is a further object of the present invention to provide for the introduction with wheelspeed information signals of gear walk anticipate signals unequal to gear frequency for improving system response.

It is yet another object of the present invention to provide means for effectively differentiating the error signals appearing at the input of a pressure brake modulator (PBM) in an anti-skid system so as to provide sinusoidal signals at gear frequency for cancelling pressure brake modulator output signals of the same frequency.

The present wheelspeed signal information processing arrangement is unique in recognizing that gear frequency sinusoidal signals which mask true wheelspeed signals may be eliminated while leaving the remaining frequency components in wheelspeed information signals for serving the desired control functions without deteriorating system performance by introducing delays to prevent interaction of gear oscillation with brake control system. The development in fact of further signals with the undesired signal processing and the introduction of these further signals with the wheelspeed derived information signals enables systems according to embodiments of the present invention to look ahead and further improve system response by causing action to be taken earlier in speeding up the hydraulic servo valve response.

In accordance with the invention, a sinusoidal signal at gear frequency is developed which has a polarity opposite to the gear walk component in the wheelspeed information channel and the introduction of this opposite polarity signal in the channel makes the system insensitive to gear walk by dynamic cancelling of the gear walk component which would otherwise reach amplitudes which would cause gear walk to develop and increase in amplitude.

In accordance with a first embodiment of this invention, a high gain amplifier and differentiator circuit is coupled across a pressure bias modulation (PBM) circuit so that the high gain amplifier and differentiator circuit provides a sinusoidal signal at gear frequency which has a polarity opposite to the gear walk component in the output of the PBM circuit, thereby cancelling the undesired gear walk component in the output of the PBM circuit.

A further embodiment of this invention processes the wheelspeed signal and superimposed gear frequency component by utilizing an additional integrating circuit in parallel with the aforementioned high gain amplifier and differentiator circuit instead of utilizing the already available PBM integrating circuit as in the aforementioned first embodiment.

The performance characteristics of the present wheelspeed information signal processing to remove undesired frequency components from the wheelspeed information channel at small signal amplitude levels before the occurrences of increasing hydraulic responses in the form of undesired gear walk will be appreciated by those skilled in the art, particularly since such signal processing is achieved without introduction of delays in brake pressure which affect system response to desired wheelspeed intelligence necessary for full control over the systems response range. The requirements for minimizing the impact of landing gear truck are similar to those for the landing gear. The pitching truck results in wheel speed perturbations at truck pitching frequency. This is sensed by skid control as slowing or speeding up of wheel. The pressure removal in response to these perturbations also results in loss of stopping performances. For purposes of simplification in the ensuing discussion, gear walk of landing gear is treated in considerable detail though the principles discussed are directly applicable to the pitching truck.

A full understanding of the invention, and of its further objects and advantages, will be had from the following description when taken in conjunction with the accompanying drawings in which.

Figure 1:
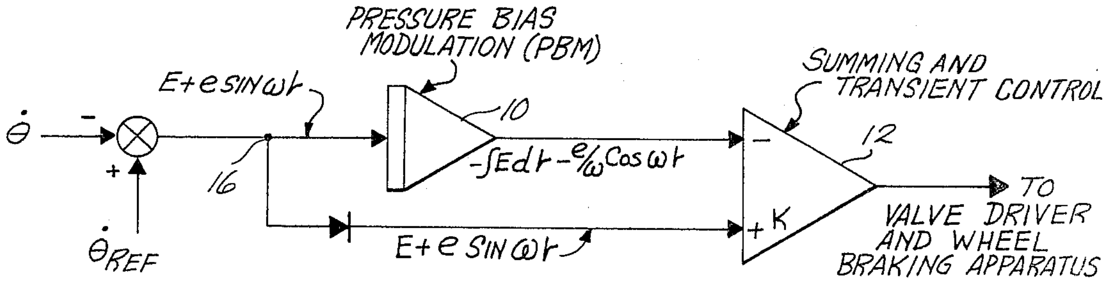
FIG. 1 is a block diagram illustrative of wheelspeed signal processing in accordance with one form of known brake control signal generating means.

Turning now to FIG. 1 of the drawings, there is shown anti-skid means in accordance with a known system wherein wheelspeed information $\dot{\theta}$ is compared with internally generated reference speed $\dot{\theta}_{REF}$ to provide the error signal $E+e \sin \omega t$ and in which E is the wheelspeed signal information contribution due to wheel departure and $e \sin \omega t$ is extraneous signal information due to gear walk. A pressure bias modulation circuit 10 integrates the error signal to produce $$\left[-\int Edt+\frac{e}{\omega}\cos \omega t\right]$$

Figure 3:
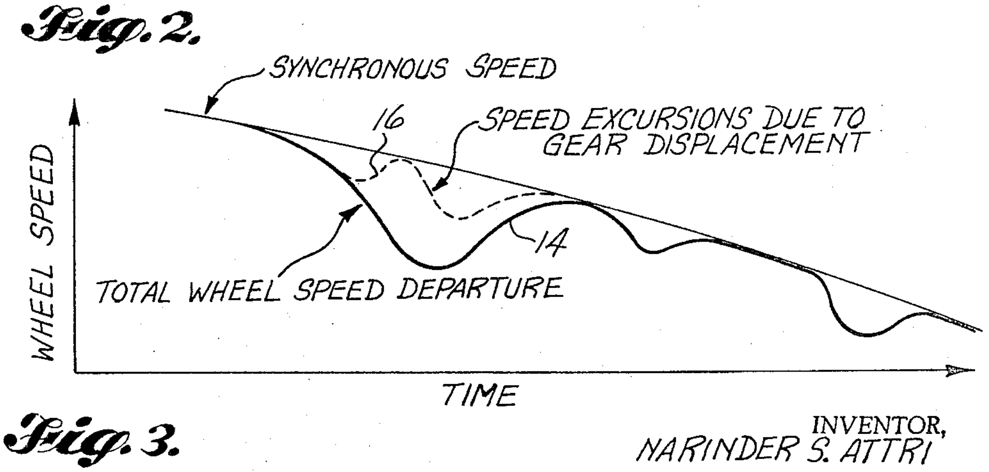
FIG. 3 is a graph illustrative of wheelspeed signal information helpful in understanding the nature of the problem presented by the contribution of gear walk generated signals upon true wheelspeed information signals.

Pressure bias modulation circuits (PBM) which control the initial valve signal in known manner are shown for example in FIG. 3 of U.S. Pat. No. 3275 384 to E. A. Hirzel. When gear displacement becomes large, the term $$\frac{e}{\omega}\cos \omega t$$

becomes sizeable and undesirable Summing circuit means 12 sums the outputs of PBM circuit 10 and K times the error signal. Theferore during brake pressure off release, the output of the summing circuit means 12 becomes:

$$\left|\int Edt-\frac{e}{\omega}\cos \omega t+kE+ke \sin \omega t\right|$$

This output valve control signal occurring during the brake pressure condition release is acceptable since during skid conditions the pressure is removed. During the brake pressure, the output control signal supplied to valve driver and wheel braking apparatus becomes:

$$\left|\int Edt-\frac{e}{\omega}\cos \omega t\right|$$

Other terms are suppressed in the summing and transient controlling circuit means 12 (due to presence of a preselected bias voltage and a diode). Of importance it should be noted at this point that the desired valve control signal should have no $$\frac{e}{\omega}\cos \omega t$$

terms as this component in the known system of FIG. 1 can lead to gear instability and other of the aforementioned problems.

Figure 2:
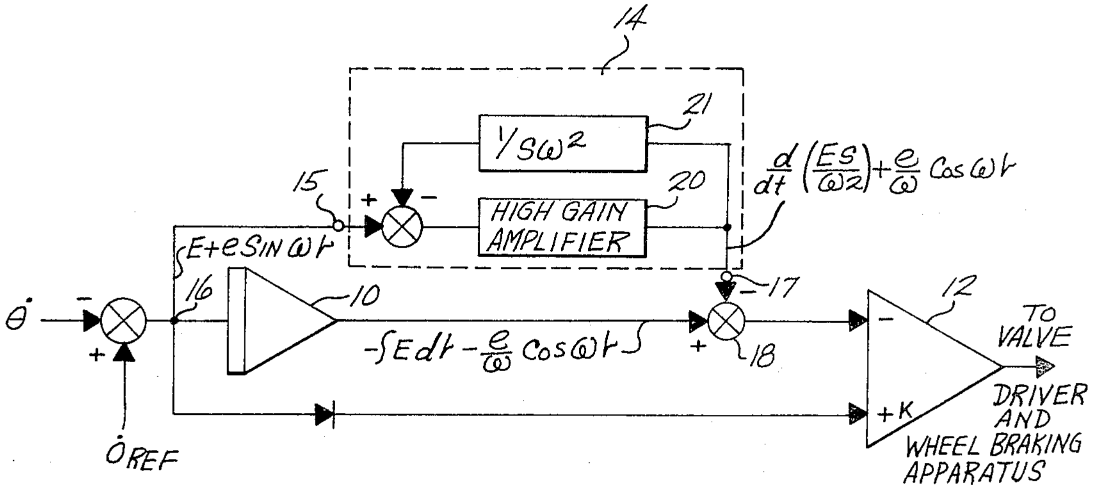
FIG. 2 is a block diagram showing wheelspeed signal processing in accordance with a first embodiment of the present invention in a brake control system of the type shown in FIG. 1.

Turning now to FIGS. 2 and 3 and the following description for an understanding of how wheelspeed information signal processing is achieved electronically to prevent gear walk occurrences, it will be noted first from an observance of a real time plot of wheelspeed information signal 14 in the graph of FIG. 3 that such a signal conveying intelligence about wheelspeed departure from synchronous speed (due to excessive brake torque) contains the sinusoidal component 16 at grear frequency. This sinusoidal component 16 is introduced in the wheelspeed transducer when the gear moves sinusoidally, adding to wheelspeed upon forward movement of the gear and subtracting from whelspeed upon rearward deflection of the gear. It is the presence of this sinusoidal information due to gear displacement which results in anti-skid systems sustaining or building gear walk once brake pressure application is made in phase with motion of the gear. The wheelspeed signal processing system embodiment of FIG. 2 has the intelligence to discriminate between wheelspeed information indicative of skid and wheelspeed information resulting from gear walk, rejecting the latter information and responding to the former information to provide output valve control signals for causing modulation of brake pressure by the wheelbraking apparatus which do not lead to a building of gear walk. The input terminal 15 of signal generating means 14 is coupled to a circuit connection 16 in the wheelspeed information channel to sample the error signal $E+e \sin \omega t$ which is also received and processed by the PBM integrating circuit 10. Signal generating means 14 is responsive to the wheelspeed information, here the error signal and provides at output terminal 17 thereof signals which are coupled at 18 back into the wheelspeed information processing channel with the output of PBM integrating circuit 10. Signal generating means 14 comprises amplifier means 20 connected between input terminal 15 and output terminal 17 with integrating circuit 21 also coupled between input terminal 15 and output terminal 17. Where the gain of amplifier means 20 is high, the output of signal generating means 14 at output terminal 17 becomes the exact differentiation of the input signal at input terminal 15, and this implicit differentiation has been accomplished by signal generating means 14 without the use of a differentiator circuit which would have the normal disadvantages or normal open loop differentiation, viz. sensitivity to electromagnetic noise. The output of signal generating circuit 14 becomes $$\frac{d}{dr}\left(\frac{Es}{\omega^2}\right)+\frac{e}{\omega}\cos \omega t$$

which is summed as hereinbefore mentioned with the output of BPM integrating circuit 10. This then results in cancelling (by addition) terms which have $$\frac{e}{\omega}\cos \omega t$$

terms. Thus during brake "pressure-on" the control situation in the wheelspeed signal processing channel results in the output from added 18 of a control signal have the form:

$$\int Edt-\frac{d}{dr}\left(\frac{Es}{\omega^2}\right)$$

(where $\omega=2\pi f$ gear)

The second term is small and not at gear frequency. Since the above control signal is free of gear frequency components, it has no means of exciting the gear.

During the brake "pressure-off" situation the outputs of transient and PBM circuit are summed at 12. The resulting value of the output valve control signal supplied to the valve driver and wheel braking apparatus is:

$$\int Edt+\frac{d}{dr}\left(\frac{Es}{\omega^2}\right)+K(E+e \sin \omega t)$$

Figure 4:
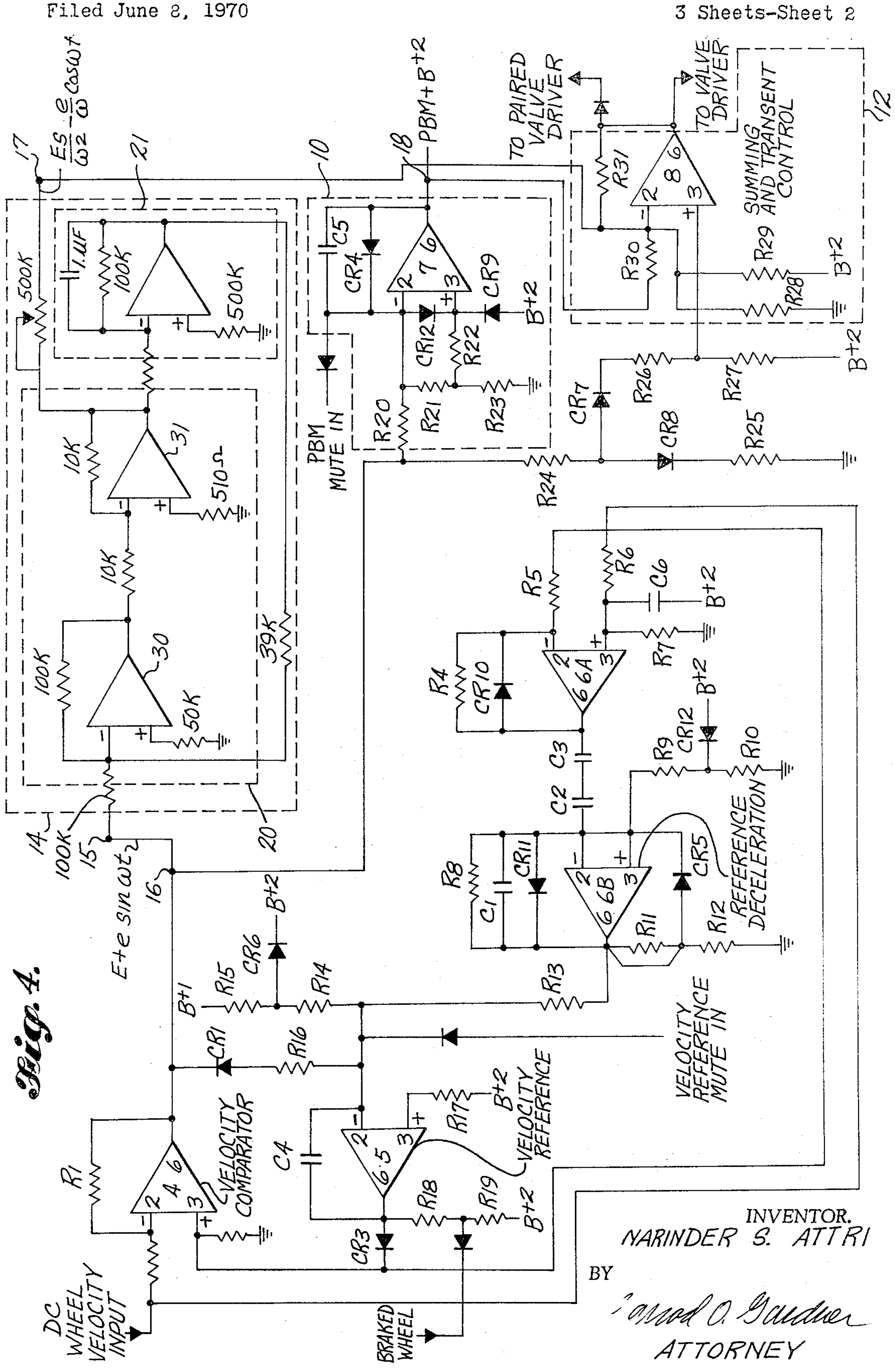
FIG. 4 is a detailed schematic diagram showing a complete circuit for wheelspeed signal processing in accordance with the embodiment shown in FIG. 2.

Referring now to FIG. 4 which is a circuit hardware implementation of the system shown in FIG. 2, there will be found one embodiment of a signal generating circuit 14 design which gave indications in simulation tests that gains of 240 feet in stopping performance could be achieved in addition to eliminating the gear walk problem. This gain in stopping performance can be attributed to the introduction by signal generating means 14 of the small lead term signal component $$\frac{d}{dr}\left(\frac{Es}{\omega^2}\right)$$

not at gear frequency. Records of test runs indicated that this small lead term speeds up the hydraulic servo valve response and these test runs indicated operation of the FIG. 4 skid control system at almost the peak of the mu-slip curve. Control signal component $$\frac{d}{dr}\left(\frac{Es}{\omega^2}\right)$$

generated by signal generating means 14 can be termed an anticipate signal since it enabled the system of FIG. 4 to look ahead and improve system response by conditioning the valve control signal to cause wheel braking apparatus action to be taken earlier. The system of FIG. 4 without signal generating means 14 connected between terminals 15 and 17 followed gear walk in simulation tests and pressure was removed in the wheel braking apparatus in response to gear walk resulting in excessive gear departures in view of design loads of the gear.

Furthermore, the stopping distance was very high since the braking component was no longer available for stopping the aircraft. The indicated achievable gain of 240 feet in performance must be appreciated in light of the fact that this is performance over aircraft having no gear walk.

In the wheelspeed signal processing system of FIG. 4 which receives wheelspeed information signals and provides anti-skid control the actual DC wheelspeed velocity input signal as shown (which is denoted $\theta$ in the block diagram of FIG. 2) is compared with a reference wheelspeed information signal (denoted $\theta_{REF}$ in the block diagram of FIG. 2) in the velocity comparator as shown in FIG. 4 to provide the signal of the form $E+e \sin \omega t_2$ at input terminal 15 of signal generating means 14. Parallel processing of the error signal from the velocity comparator through integrating (PBM) circuit means 10 and signal generating means 14 provides signals which are added at circuit connection 18 back into the wheelspeed information processing channel for further processing by summing and transient control means 12 to provide the output valve control signals which cause modulation of brake pressure in subsequent wheelbraking apparatus. The parallel processing through signal generating means 14 and integrating circuit means 10 of the error signal and combination (by addition) of the outputs of signal generating means 14 and integrating circuit means 10 in circuit connection 18 results in the hereinbefore discussed cancellation (by addition at circuit connection 18) of the gear walk sinusoidal frequency component developed in the wheelspeed signal processing channel by wheel transducer motion due to gear displacements from gear walk. Signal generating means 14 comprises high gain amplifying means including first amplifier stage 30 cascaded with second amplifier stage 31 coupled between input terminal 15 and output terminal 17. Coupled between an input of first amplifier stage 30 and the output of second amplifier stage 31 is a feedback circuit path including integrating circuit 21. As previously explained in connection with the functional explanation of system in block diagram form in FIG. 2. If the gain of the amplifier 20 (here comprising cascaded connected amplifier stages 30 and 31) is high, then the output provided at output terminal 17 becomes the differentiation of the input introduced at input terminal 15 and this differentiation has been accomplished without the use of open loop differentiation which would be susceptible to electromagnetic noise and other technical problems. Signal generating means 14 providing differentiation of the wheelspeed information signal here comprising the error signal combined with parallel processing by integration of the same error signal results in cancellation out of the undesired wheelspeed information signals in the form of sinusoidal components at gear frequency. Also the generation in signal generating means 14 of an anticipate signal having the form $$\frac{d}{dr}\left(\frac{Es}{\omega^2}\right)$$

and its introduction into the wheelspeed information signal processing channel at circuit connection 18 causes wheelbraking apparatus response to commence before the time such action would normally commence thus improving braking performance in the manner hereinbefore discussed.

The invention embodiment of FIG. 4 consists of two circuit portions 20 and 21. Circuit portion 20 comprises an amplifier circuit portion consisting of operational amplifiers 30 and 31 connected in series, the gain being determined by the values of the feedback and input resistors in a manner known to those skilled in the art. Circuit portion 21 consists of an operational amplifier with a capacitor feedback and resistor input, thus producing the integral of the output from amplifier 31. The output of circuit portion 21 is summed with the input to amplifier 30 thus forming a feedback circuit around the amplifier circuit portion 20. When the circuit portions 20 and 21 are connected in this manner, the output of amplifier 31 becomes the implicit differential of the signal at input terminal 15. The variable 500K resistor determines the gain into the summing and transient control circuit 12.

The output of the summing and transient control circuit 12 is applied to the valve to provide the required pressure to the aircraft brake. The summing and transient control circuit 12 combines and amplifies the output signals from the signal generating means 14, the PBM circuit 10, and an error signal from terminal 16 processed through a threshold circuit consisting of resistors R24, R25, R26, and R27, and diodes CR7 and CR8. The PBM circuit produces the integral of the error signal at terminal 16 and couples this integral signal to the summing and transient control circuit 12. The output error signal is produced by the velocity comparator circuit, amplifier 4, which produces the difference between the DC wheel velocity signal and a reference wheel velocity signal generated by amplifier circuit 5. The reference deceleration circuit provides deceleration information to the reference velocity circuit.

Figure 5:
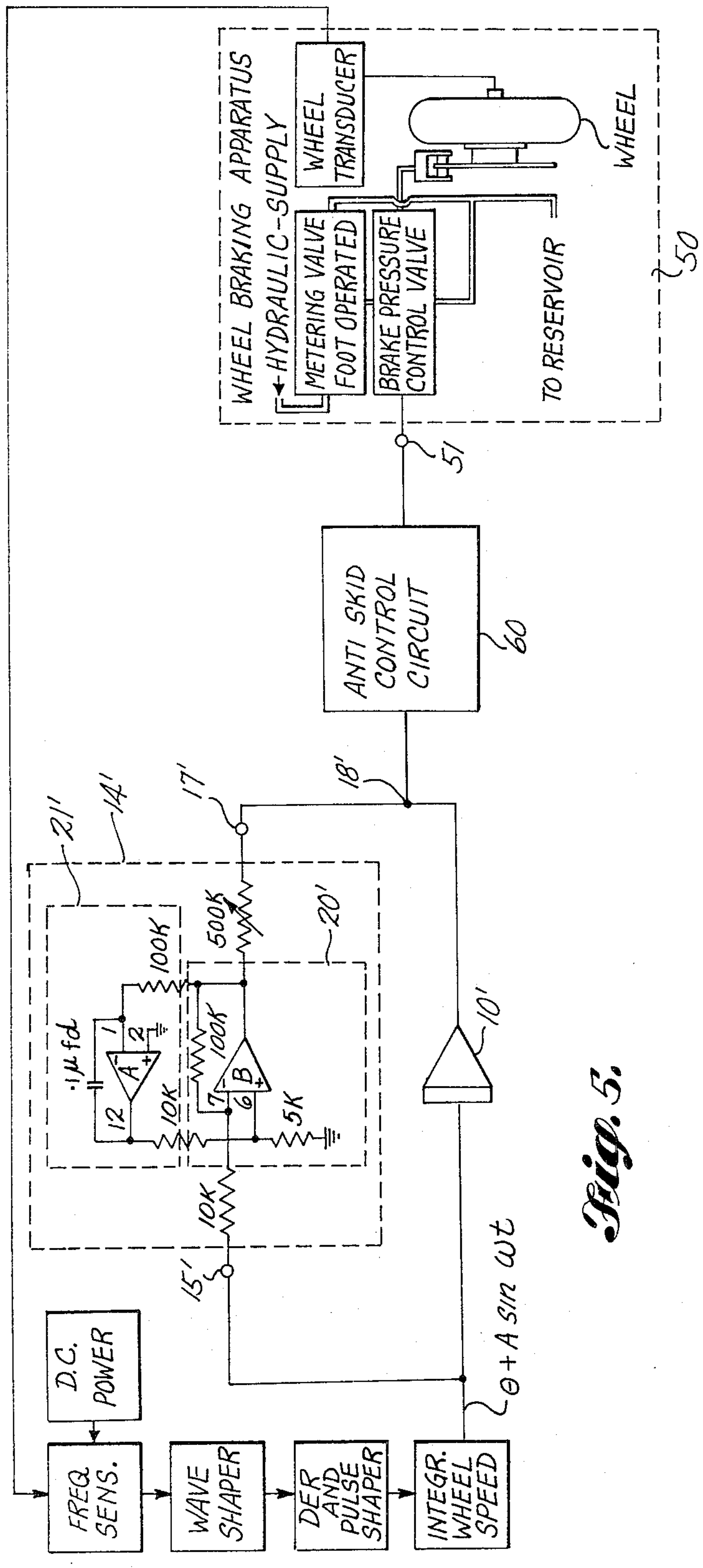
FIG. 5 is a schematic diagram of wheelspeed signal processing arrangement in accordance with a further embodiment of the invention.

The invention embodiment of FIG. 5 more particularly the signal generating circuit 14' consists of two circuit portions 20 and 21' each consisting of an operational amplifier and input and feedback circuit elements. The circuit components in circuit portion 20' form an amplifier. Operational amplifier A, using capacitive feedback and resistive input, forms an integrator circuit which is connected in a feedback path around the high gain amplifier circuit portion 20'. This circuit combination results in an implicit differentiation of the input 15' which is provided at the output of operational amplifier B. The 500K variable resistor determines the gain into anti-skid control circuit 60.

Turning now to FIG. 5, there is shown a further embodiment of the invention wherein a superimposed sinusoidal component at gear frequency is removed from the wheelspeed information signal processing channel by means for differentiating the wheelspeed information signals which include the above mentioned undesired sinusoidal component coupled in parallel with means 10' for integrating the same wheelspeed information signals present at circuit connection 15' having the said undesired component and wherein the outputs of means 14' and 10' connected in parallel and provided at circuit connection 18' provide wheelspeed information signals free of the above mentioned undesired sinusoidal component. Coupled to receive the wheelspeed information at terminal 18' is an anti-skid control circuit 60 which provides an output valve control signal to the input terminal 51 of the brake pressure control valve operating circuit of wheelbraking apparatus 50. Wheelbraking apparatus 50 driven by anti-skid control circuit 60 is conventional e.g. as is shown connected to brake pressure control valve 5 in FIG. 1 of the U.S. Pat. 3,026,148 to Ruof. Differential amplifiers A and B of signal generating means 14' comprised Motorola type A741C in the circuit tested.

Various other types of anti-skid systems can be provided with intelligence to sense the gear walk excursions and be made insensitive to these by elimination of the gearwalk contribution by utilizing the principles of dynamic cancellation in accordance with the teachings of the present invention e.g. the means 14' for differentiating the wheelspeed information in parallel with means 10' for integrating the wheelspeed information can be coupled ahead of capacitor C9 in the anti-skid system of FIG. 3 of U.S. Pat. No. 3,275,384 to E. A. Hirzel to cancel the effect of gear walk introduced wheelspeed information signals before they become differentiated by capacitor C9.

While in the preceding description of the invention exemplary circuit means and connections as well as specific electrical values have been set forth by way of example, it will be evident to those skilled in the art that in the light of the present disclosure variations may be made without departing from the true spirit and scope of the invention and without exercise of more than ordinary skill in the art. Accordingly, it is not desired that the invention be restricted to the exemplary details, other than is required by the recitations of the appended claims.

I claim:

1. In a control system for a brake of an aircraft wheel which is carried by longitudinally movable gear structure having a predetermined natural period of oscillation, the combination of:

first means for generating wheelspeed information control signals and sinusoidal signals having said predetermined period of oscillation, wheel braking apparatus for establishing a brake application on the vehicle wheel, second means coupled between said first means and said wheel braking apparatus for differentiating said sinusoidal signals, third means coupled between said first means and said wheel braking apparatus for integrating said sinusoidal signals, and fourth means for adding the outputs of said second and third means to inhibit the transmission of said sinusoidal signals to said wheel braking apparatus.

2. The invention according to claim 1 wherein said second means comprises amplifier means and integrating means, said integrating means connected in feedback circuit path around said amplifier means.

3. The invention according to claim 2 wherein said amplifier means comprises first and second amplifier stages connected in cascade circuit configuration for providing high gain amplification.

4. The invention according to claim 1 wherein said third means comprises pressure bias modulation circuit means.

5. Anti-skid control means for an aircraft wheel which is carried by longitudinally flexible landing gear structure having a predetermined natural period of oscillation comprising, in combination:

first means responsive to wheelspeed information signals for providing anti-skid control signals;

second means including a hydraulic servo valve for controlling braking effort in response to said anti-skid control signals;

signal generating means coupled between said first means and said second means for generating an anti-skid control signal component having an amplitude which is a function of said natural period of oscillation of said landing gear to speed up the response of said hydraulic servo valve, wherein said signal generating means comprises integrating circuit means and high gain amplifier circuit means, said integrating circuit means connected in feedback around said high gain amplifier circuit means.

6. An anti-skid control system comprising in combination:

anti-skid control signal generating means;

means for generating gear oscillation anticipate signals including:

first means for deriving sinusoidal signals from wheelspeed information due to gear displacement;

second means responsive to said first means for effectively differentiating said sinusoidal signals to provide said gear oscillation anticipate signals, and third means for integrating said sinusoidal signals, fourth means for combining said gear oscillation anticipate signals with said integrated sinusoidal signals.

7. An anti-skid control system according to claim 6 wherein said fourth means comprises a circuit connection for adding said signals.

8. In combination in anti-skid control system:

velocity comparator circuit means for comparing wheelspeed information signals and providing an output error signal;

summing and transient control circuit means for producing output valve control signals;

pressure bias modulation circuit means for integrating said output error signal and coupled to said summing and transient control circuit means; and signal generating means responsive to said output error signal and coupled to said summing and transient control circuit means for generating an anti-skid control signal component which is a function of the natural period of oscillation of the landing gear.

9. The combination according to claim 8 wherein said signal generating means comprises amplifier circuit means and integrating circuit means, said integrator circuit means connected in feedback circuit path around said amplifier circuit means to provide implicit differentiation of said output error signal.

10. The combination according to claim 8 wherein said signal generating means comprises means for effectively differentiating said error signal to provide sinusoidal correction signals out of phase with gear walk generated sinusoidal signal components superimposed upon said output error signals.

11. In combination in an anti-skid control system:

first DC wheel velocity signal generating means;

velocity reference circuit means for deriving a reference velocity signal from said first means;

velocity comparator circuit means for comparing signals derived from said first means and velocity reference circuit means and providing an output error signal;

summing and transient control circuit means for producing output valve control signals;

pressure bias modulation means for integrating said output error signal, said pressure bias modulation means coupled to said summing and transint control circuit means; and, further signal generating means responsive to said output error signal and coupled to said summing and transient control circuit means, wherein said signal generating means comprises means for effectively differentiating said error signal to provide sinusoidal correction signals out of phase with gear walk generated sinusoidal signal components superimposed upon said output error signals.

12. The combination according to claim 11 wherein said signal generating means comprises amplifier circuit means and integrator circuit means, said integrator circuit means connected in feedback circuit path around said amplifier circuit means to provide implicit differentiation of said output error signal.

References Cited

UNITED STATES PATENTS

| | | | |
|---|---|---|---|
| 3,017,145 | 1/1962 | Yarber | 303—21 P |
| 3,026,148 | 3/1962 | Ruof | 303—21 CG |
| 3,245,727 | 4/1966 | Anderson et al. | 303—21 EB |
| 3,275,384 | 9/1966 | Hirzel | 303—21 EB |
| 3,545,819 | 12/1970 | Gaffney et al. | 303—21 R |

MILTON BUCHLER, Primary Examiner

S. G. KUNIN, Assistant Examiner

U.S. Cl. X. R.

244—111; 303—20

UNITED STATES PATENT OFFICE
CERTIFICATE OF CORRECTION

Patent No. 3,669,508 Dated June 13, 1972

Inventor(s) Narinder S. Attri

It is certified that error appears in the above-identified patent and that said Letters Patent are hereby corrected as shown below:

Column 1 in the heading, after line 6, insert -- Assignee The Boeing Company, Seattle, Wash., a corp of Delaware -- .

Signed and sealed this 12th day of December 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334